(12) United States Patent
Kim

(10) Patent No.: US 11,516,285 B2
(45) Date of Patent: Nov. 29, 2022

(54) CLOUD SYSTEM REALIZATION APPARATUS AND METHOD, RECORDING MEDIUM STORING PROGRAM FOR EXECUTING THE SAME

(71) Applicant: CLOUD4U, Seoul (KR)

(72) Inventor: Kihyeon Kim, Seoul (KR)

(73) Assignee: CLOUD4U, Seoul (KR)

( * ) Notice: Subject to any disclaimer, the term of this patent is extended or adjusted under 35 U.S.C. 154(b) by 0 days.

(21) Appl. No.: 17/013,930

(22) Filed: Sep. 8, 2020

(65) Prior Publication Data

US 2021/0176305 A1 Jun. 10, 2021

(30) Foreign Application Priority Data

Dec. 5, 2019 (KR) .................... 10-2019-0160973
Aug. 11, 2020 (KR) .................... 10-2020-0100454

(51) Int. Cl.
*H04L 67/1029* (2022.01)
*G06F 9/54* (2006.01)

(52) U.S. Cl.
CPC .......... *H04L 67/1029* (2013.01); *G06F 9/547* (2013.01)

(58) Field of Classification Search
CPC ............ G06F 8/60; H04L 47/70; H04L 67/02
See application file for complete search history.

(56) References Cited

U.S. PATENT DOCUMENTS

| | | | |
|---|---|---|---|
| 10,951,540 B1* | 3/2021 | De Kadt | H04L 47/787 |
| 2002/0009223 A1* | 1/2002 | Wong | G06V 30/422 382/154 |
| 2005/0216487 A1* | 9/2005 | Fisher | H04N 1/2191 |
| 2007/0268519 A1* | 11/2007 | Appercel | G06F 3/1205 358/1.15 |
| 2011/0273728 A1* | 11/2011 | Sasaki | G06K 15/005 358/1.2 |
| 2014/0152700 A1* | 6/2014 | Koziarz | G06F 3/1288 345/636 |
| 2015/0049951 A1* | 2/2015 | Chaturvedi | G06V 30/40 382/190 |
| 2016/0088185 A1* | 3/2016 | Nagasaka | H04N 1/40062 358/1.2 |
| 2016/0224939 A1* | 8/2016 | Chen | G06Q 10/06311 |
| 2017/0168900 A1* | 6/2017 | Lucas | G06F 11/1441 |
| 2017/0228227 A1* | 8/2017 | Winterfeldt | G06F 9/5066 |
| 2017/0249574 A1* | 8/2017 | Knijnik | G06Q 10/06313 |
| 2018/0129639 A1* | 5/2018 | Darrow | H04L 51/08 |

(Continued)

*Primary Examiner* — Mahran Y Abu Roumi
(74) *Attorney, Agent, or Firm* — Bridgeway IP Law Group, PLLC; Jihun Kim

(57) ABSTRACT

An apparatus for constructing a cloud system may interpret a drawing file, may generate automation task information, which is the contents of an automation task including at least one of a task indicating that one or more cloud resources need to be automatically generated, modified or deleted, and a task indicating that software needs to be automatically installed, updated or deleted with respect to the one or more cloud resources, using the results of the interpretation, may interpret the automation task information, and may generate interface task information, which is the contents of an interface task for instructing a specific cloud platform or the specific one or more cloud resources to perform the automation task, using results of the interpretation.

12 Claims, 5 Drawing Sheets

(56) References Cited

U.S. PATENT DOCUMENTS

| | | | |
|---|---|---|---|
| 2018/0181632 A1* | 6/2018 | Zarum | G06F 16/83 |
| 2019/0007804 A1* | 1/2019 | Tardelli | G06Q 10/10 |
| 2019/0138251 A1* | 5/2019 | Konishi | G06F 3/1204 |
| 2020/0241944 A1* | 7/2020 | Derdak | G06F 9/547 |
| 2020/0379816 A1* | 12/2020 | Lin | G06F 9/5072 |
| 2021/0109789 A1* | 4/2021 | McWeeney | G06F 9/5022 |
| 2021/0166827 A1* | 6/2021 | Lim | G06F 30/13 |

\* cited by examiner

CLOUD SYSTEM REALIZATION APPARATUS AND METHOD, RECORDING MEDIUM STORING PROGRAM FOR EXECUTING THE SAME

FIELD OF THE INVENTION

The present invention relates to an apparatus for constructing a cloud system, in particular, a system including one or more cloud resources, such as a virtual server, a storage, a container, and a network, using a cloud technology and a method therefor.

BACKGROUND OF THE INVENTION

In general, the fourth industrial revolution requires many computer resources in an implementation of artificial intelligence, the management of information obtained through a sensor, data analysis, etc. A so-called cloud technology is a technology that efficiently enables the implementation, the management, the data analysis, etc. Prior to the appearance of the cloud technology, an information technology (IT) system developer must invest significant time and costs in introducing a server in order to develop an IT system and preparing software necessary for a specific system. However, the cloud technology has significantly reduced the time and costs taken for the development of the IT system. For reference, in this specification, the cloud system refers to an IT system constructed in a cloud platform using the cloud technology, and the system designer means a cloud system designer.

However, since a unique task environment is provided to each cloud platform, although a developer has developed a cloud system based on a specific cloud platform, if the developer wants to construct a cloud system having the same function in a cloud platform different from the specific cloud platform, the developer has to bear the hassle of newly learning how to use the different cloud platform and of designing and constructing the cloud system according to a different procedure.

Furthermore, in a cloud system constructed using the existing cloud technology, it is difficult to check an overall structure or contents of the cloud system because the cloud system is represented as a large amount of web page documents in which difficult technical terms are listed. Furthermore, it is difficult for a developer to construct a system identical with or similar to the cloud system because it is difficult to deliver or describe the overall structure or contents to other persons.

For the same reason, although a system developer constructs a cloud system using the cloud technology, the system developer still has to invest considerable time and efforts in sequentially designing and constructing many cloud resources, such as a server, a storage, and a network.

CONTENTS OF THE INVENTION

Problems to be Solved

An embodiment of the present invention has an object of enabling a user not having skilled knowledge of a cloud platform to easily construct a cloud system in various cloud platforms.

Means for Solving the Problems

In order to achieve the above object, an apparatus for constructing a cloud system according to an embodiment for constructing a cloud system, that is, a system including one or more cloud resources, using a cloud technology may include an automation task generation unit interpreting a drawing file and generating automation task information, which is the contents of an automation task including at least one of a task indicating that the cloud resources need to be automatically generated, modified or deleted, and a task indicating that software needs to be automatically installed, updated or deleted with respect to the cloud resources, using the results of the interpretation; and an automation task execution management unit interpreting the automation task information and generating interface task information, which is the contents of an interface task for instructing a specific cloud platform or the specific cloud resources to perform the automation task, using the results of the interpretation.

In this case, the apparatus for constructing a cloud system according to an embodiment may further include an interface task execution management unit interpreting the interface task information and automatically constructing a cloud system by instructing the specific cloud platform or the specific cloud resources to perform the interface task using the results of the interpretation.

Meanwhile, the automation task is applicable to a plurality of different cloud platforms, and the automation task execution management unit may generate the interface task information that matches the specific cloud platform by interpreting the automation task information.

Furthermore, the apparatus for constructing a cloud system according to an embodiment may further include a system design unit enabling a user to generate the drawing file including one or more figures and one or more lines while viewing a screen. In this case, the apparatus for constructing a cloud system may further include a design drawing storage unit storing the generated drawing file. The drawing file stored in the design drawing storage unit may be copied.

Furthermore, according to an embodiment, when the drawing file is updated, the automation task information and the interface task information may be automatically updated.

Meanwhile, the apparatus for constructing a cloud system according to an embodiment may recover the cloud system based on the automation task information and the interface task information corresponding to the drawing file at specific timing.

In addition, the apparatus for constructing a cloud system according to an embodiment may further include an interface task library previously registering and storing available interface task information for each available cloud platform as a library. The automation task execution management unit may transmit the interface task information to the interface task execution management unit as registered in the library.

In order to achieve the above object, a method of constructing a cloud system according to another embodiment for constructing a cloud system, that is, a system including one or more cloud resources using a cloud technology, may include the steps of interpreting a drawing file and generating automation task information, which is the contents of an automation task including at least one of a task indicating that the cloud resources need to be automatically generated, modified or deleted, and a task indicating that software needs to be automatically installed, updated or deleted with respect to the cloud resources, using the results of the interpretation; and interpreting the automation task information and generating interface task information, which is the contents of an interface task for instructing a specific cloud platform or the specific cloud resources to perform the automation task, using the results of the interpretation.

In this case, the method of constructing a cloud system according to another embodiment may further include the step of interpreting the interface task information and automatically constructing a cloud system by instructing the specific cloud platform or the specific cloud resources to perform the interface task using the results of the interpretation.

Meanwhile, the automation task may be applied to a plurality of different cloud platforms. The step of generating the interface task information may include generating the interface task information that matches the specific cloud platform by interpreting the automation task information.

Furthermore, the method of constructing a cloud system according to another embodiment may further include the step of enabling a user to generate the drawing file including one or more figures and one or more lines while viewing a screen. The drawing file interpreted in the step of generating the automation task information may be the generated drawing file.

Furthermore, according to another embodiment, when the drawing file is updated, the automation task information and the interface task information may be automatically updated.

Meanwhile, in the method of constructing a cloud system according to another embodiment, the cloud system may be recovered based on the automation task information and the interface task information corresponding to the drawing file at specific timing.

In order to achieve the above object, a computer-readable recording medium according to still another embodiment stores a computer program including the steps of interpreting a drawing file and generating automation task information, that is, the contents of an automation task including at least one of a task indicating that the cloud resources need to be automatically generated, modified or deleted and a task indicating that software needs to be automatically installed, updated or deleted with respect to the cloud resources, using the results of the interpretation; and interpreting the automation task information and generating interface task information, that is, the contents of an interface task for instructing a specific cloud platform or the specific cloud resources to perform the automation task, using the results of the interpretation.

Effects of the Invention

According to an embodiment of the present invention, unlike in a case where an interface task is generated by keeping a specific cloud platform in mind, an automation task may be applied to all of possible cloud platforms without being limited to a specific cloud platform, corresponding automation task information is generated based on the design contents of a cloud system, and thus corresponding interface task information is generated. Accordingly, a system developer can design a cloud system using the same method regardless of a cloud platform. In particular, an embodiment of the present invention enables a system designer to construct cloud systems, operating in a plurality of different cloud platforms, using the same design method. Accordingly, a system designer does not need to learn how to use each cloud platform every time and can reduce time and costs necessary to construct a cloud system.

Furthermore, the apparatus and method for constructing a cloud system according to an embodiment of the present invention automatically construct a cloud system by interpreting the design drawing of the cloud system which may be visually and intuitively recognized to the extent that even a person not skilled in a cloud platform can understand the cloud system. Accordingly, a system designer can design a cloud system very easily. As a result, the system designer can design a cloud system more easily and with a little error because the system designer can design the entire IT system, while viewing the IT system at a look, without a repetitive screen task for generating individual cloud resources, and can design a cloud system by drawing a picture using figures and lines without designing the cloud system using a large amount of web page documents in which difficult technical terms are listed.

In addition, according to an embodiment of the present invention, since a drawing file designed by a system designer can be copied or moved in a document form, education, supervision, inspection, etc. for a third party can be facilitated, and the extension of a cloud system or the recovery of an obstacle occurring in a cloud system can be efficiently performed.

DETAILED CONTENTS FOR PRACTISING THE INVENTION

Figure 1:
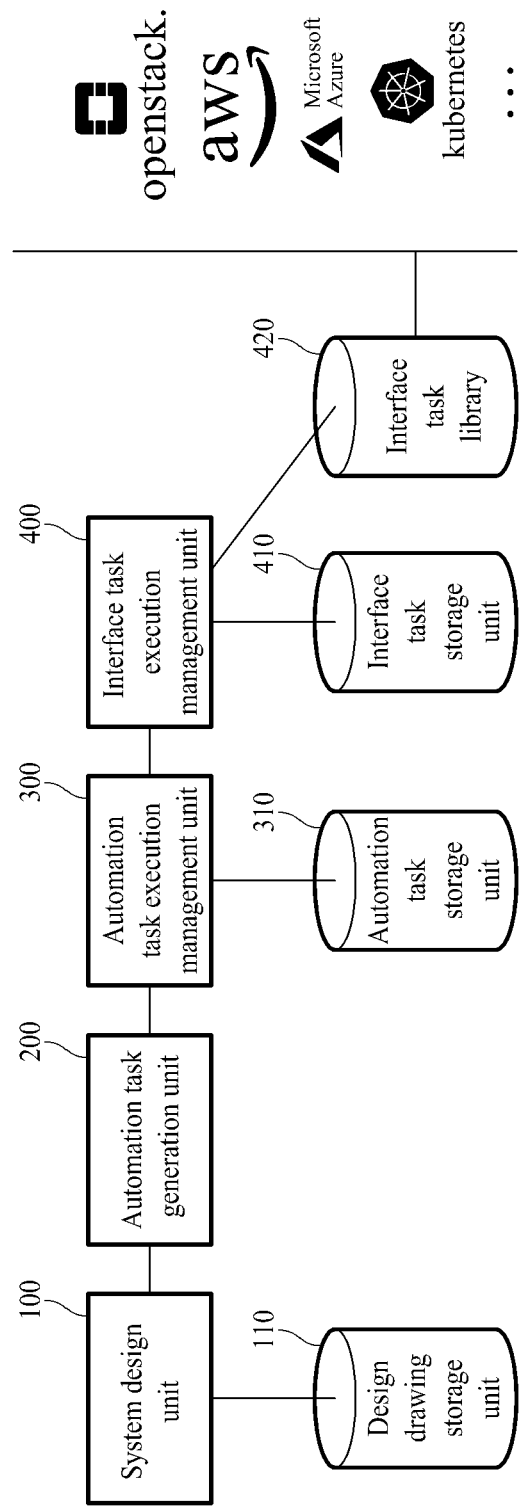
FIG. 1 is a block diagram of an apparatus for constructing a cloud system according to an embodiment of the present invention.

An apparatus for constructing a cloud system according to an embodiment of the present invention is described below with reference to FIGS. 1 to 4.

The apparatus for constructing a cloud system according to an embodiment of the present invention includes a system design unit 100, a design drawing storage unit 110, an automation task generation unit 200, an automation task execution management unit 300, an automation task storage unit 310, an interface task execution management unit 400, an interface task storage unit 410, and an interface task library 420.

The system design unit 100 enables a user to generate a drawing file including one or more figures and one or more lines, while viewing a screen. For reference, in this specification, a representative example of a "user" may be said to be the aforementioned system developer. Hereinafter, description is given on the premise that the system developer and the user are the same. The system developer may design a cloud system using one or more figures and one or more lines, while viewing a computer screen as if the system developer draws the cloud system on canvas paper using one or more icons and one or more straight lines or curves. An element that provides such a task environment and generates a drawing file based on the contents of the cloud system designed by the system developer is the system design unit 100.

Figure 2:
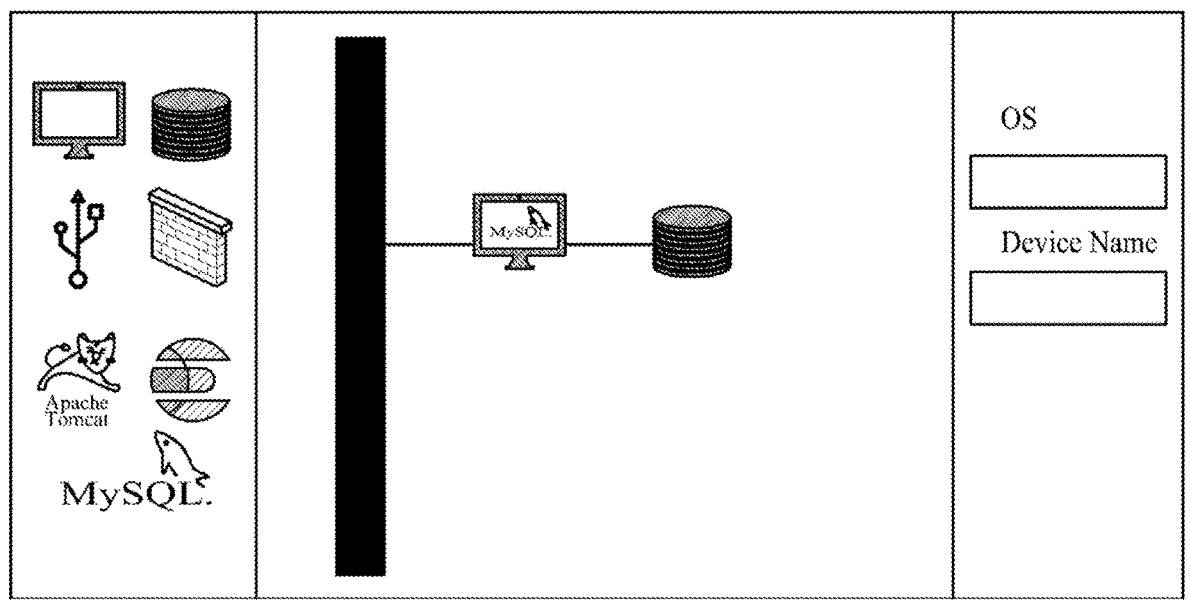
FIG. 2 is an example of a task screen according to a system design unit illustrated in FIG. 1.

To this end, as illustrated in FIG. 2, the system design unit 100 represents, as figures such as icons, cloud resources, such as a server, a storage, a network, a virtual machine, and a firewall, and containers or software which may be installed on the resources. Furthermore, a line provided by the system design unit 100 represents a connection relationship, a dependency relationship, etc. between elements of a cloud system, such as a cloud resource and software installed on the cloud resource.

Furthermore, the system design unit 100 enables the system developer to generate, modify or delete a cloud resource represented as a figure or to install, update or delete a container or software for a cloud resource through a mouse manipulation, while viewing the entire cloud system on a computer screen at a look, and to easily design a cloud system by connecting cloud resources using a line.

Meanwhile, as may be seen from FIG. 2, the system developer may input, to an entry window, information for setting the type of operating system (OS), a version of software or the size of a container installed on a cloud resource, such as a server, while viewing a screen provided by the system design unit 100.

The drawing file generated by the system design unit 100 may be copied or moved to the outside because the drawing file is stored in the design drawing storage unit 110 in a document form.

Figure 3:
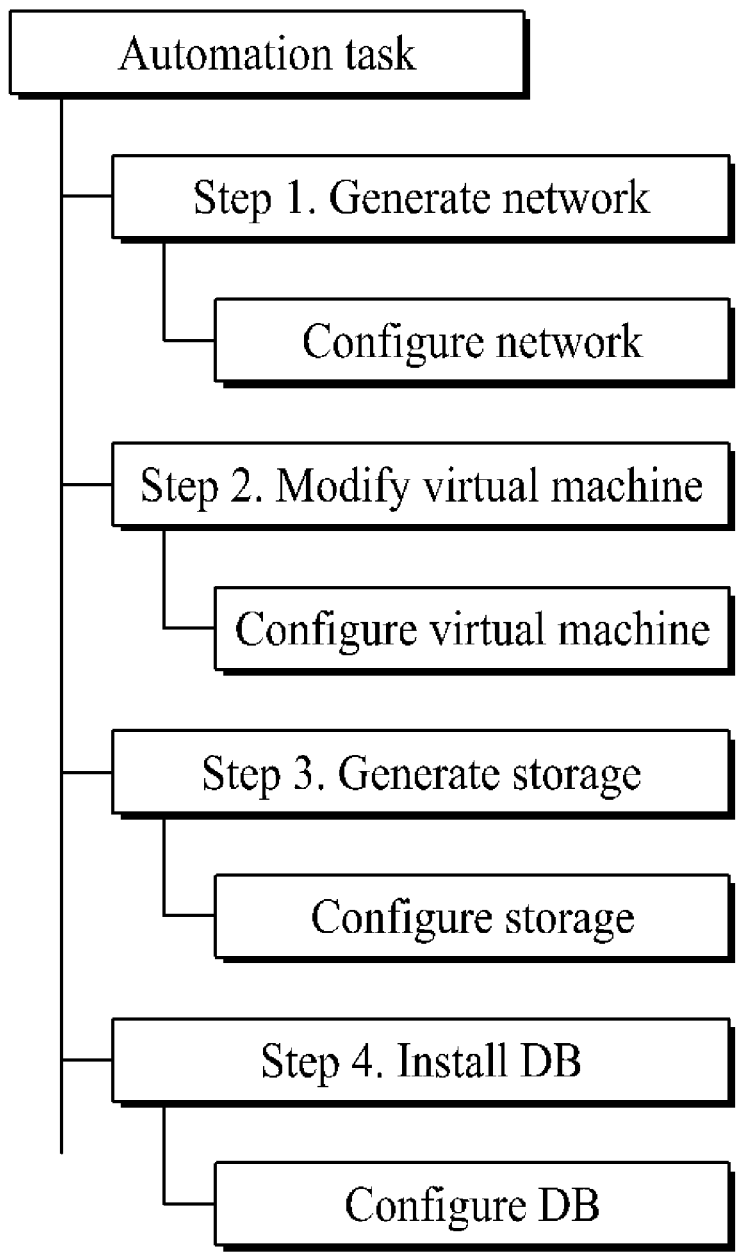
FIG. 3 is an example of automation task information generated by an automation task generation unit illustrated in FIG. 1.
Figure 4:
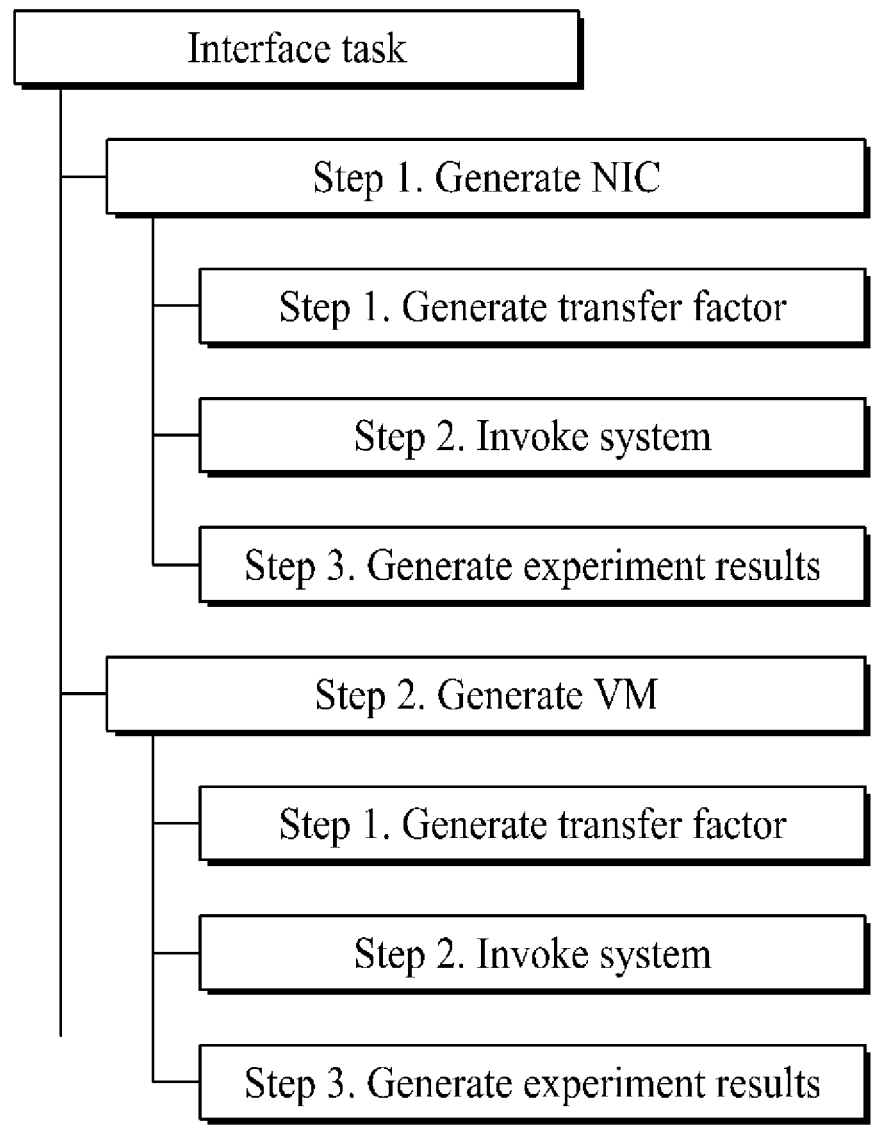
FIG. 4 is an example of interface task information generated by an interface task generation unit illustrated in FIG. 1.

The automation task generation unit 200 interprets the drawing file, and generates automation task information, that is, the contents of an automation task that means a task, including at least one of a task indicating that one or more cloud resources should be automatically generated, modified or deleted and a task indicating that software should be automatically installed, updated or deleted with respect to one or more cloud resources, using the results of the interpretation. Meanwhile, FIG. 3 is an example of automation tasks indicated by automation task information generated by the automation task generation unit 200.

Such an automation task is not limited to a cloud platform and may be applied to all cloud platforms. Accordingly, the apparatus and method for constructing a cloud system according to an embodiment of the present invention enable a system designer to efficiently design and construct a cloud system even without learning how to use each cloud platform.

Meanwhile, the drawing file interpreted by the automation task generation unit 200 may be the drawing file generated by the system design unit 100.

As described above, the drawing file may include information for setting the type of OS, a version of software, the size of a container, etc. installed on cloud resources, such as a server. In this case, the automation task generation unit 200 checks the information by interpreting the drawing file, and generates automation task information corresponding to the checked information.

The automation task execution management unit 300 interprets the automation task information generated by the automation task generation unit 200, and generates interface task information, that is, the contents of an interface task for instructing a specific cloud platform or specific cloud resources to execute the automation task, using the results of the interpretation. As described above, FIG. 4 is an example of interface tasks indicated by interface task information generated by the automation task execution management unit 300.

The automation task execution management unit 300 is connected to the automation task storage unit 310 for storing the results of the execution of automation tasks based on the automation task information generated by the automation task generation unit 200, that is, the interface task information. If a drawing file is updated, the automation information generation unit 200 automatically updates automation task information in accordance with the updated drawing file, and interface task information stored in the automation task storage unit is automatically updated. Accordingly, according to an embodiment of the present invention, a cloud system can be changed if a drawing file has only to be changed. Accordingly, the cloud system can always be effectively managed.

The interface task execution management unit 400 interprets the interface task information generated by the automation task execution management unit 300, and automatically constructs a cloud system by instructing a specific cloud platform or specific cloud resources to execute an interface task based on the results of the interpretation.

Meanwhile, the interface task execution management unit 400 is connected to the interface task storage unit 410 for storing the results of the execution of interface tasks based on the interface task information generated by the automation task execution management unit 300. If a drawing file is updated, the automation task execution management unit 300 automatically updates interface task information in accordance with the updated drawing file, and execution result information stored in the interface task storage unit 410 is automatically updated. Accordingly, according to an embodiment of the present invention, a cloud system can be changed if a drawing file has only to be changed. Accordingly, the cloud system can always be effectively managed.

The interface task execution management unit 400 may also be connected to the interface task library 420 for previously registering and storing available interface task information for each available cloud platform as a library. In this case, the automation task execution management unit 300 transmits the interface task information to the interface task execution management unit 400 in a simplified form, as registered in the library.

The interface task library 420 may previously have interface task information including various contents for each cloud platform as a library with respect to many different cloud platforms. In this case, the automation task execution management unit 300 may receive the same one piece of automation task information, and may generate interface task information that may be indicated for many different cloud platforms by interpreting the received automation task information. Accordingly, a system developer can easily construct a cloud system in a so-called hybrid cloud or multi-cloud environment in which several cloud platforms are simultaneously used.

In addition, the interface task library 420 may define and have additional interface task information different from the interface task information generated by the automation task execution management unit 300. Accordingly, the interface task execution management unit 400 may automatically construct more parts than the interface task information generated by the automation task execution management unit 300 by connecting the additional interface task information and the interface task information generated by the automation task execution management unit 300.

Figure 5:
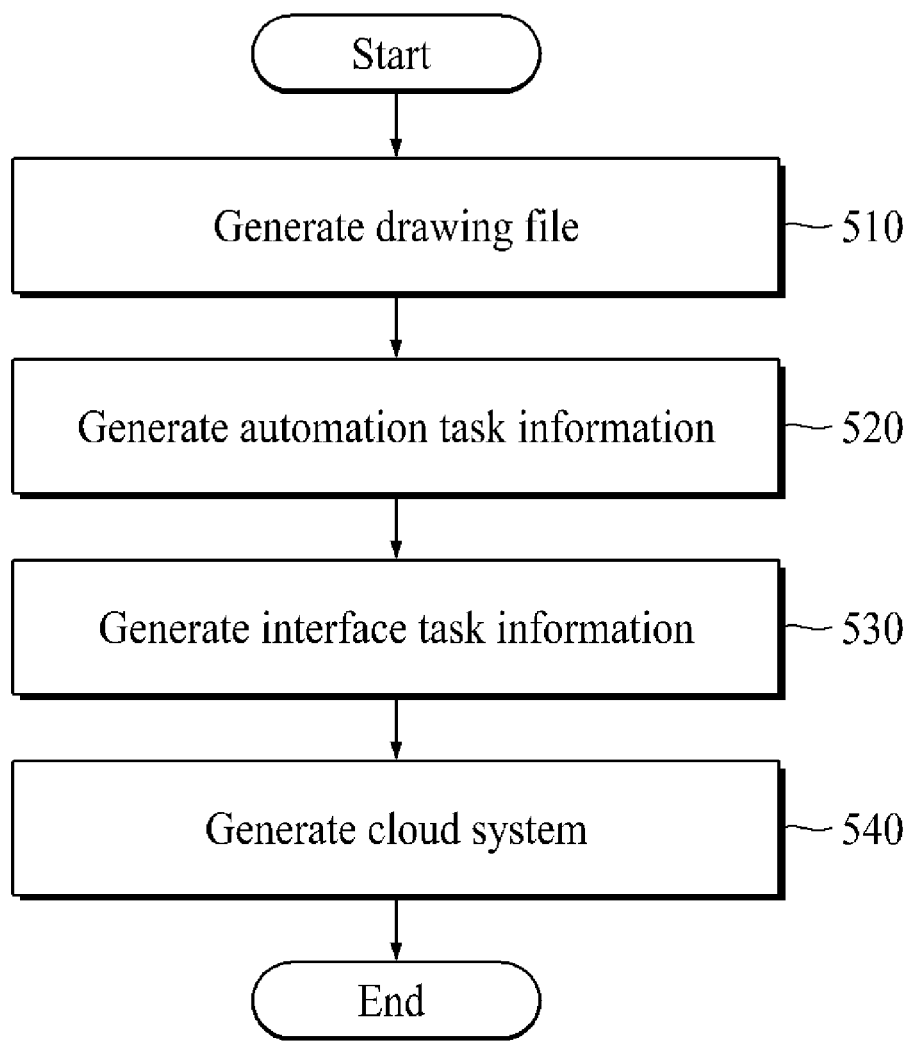
FIG. 5 is a flowchart of a method of constructing a cloud system according to another embodiment of the present invention.

Finally, a method of constructing a cloud system according to another embodiment of the present invention is described with reference to FIG. 5. The method of constructing a cloud system includes the step (step 510) of enabling a system developer to generate a drawing file including one or more figures and one or more lines while viewing a screen, the step (step 520) of interpreting the generated drawing file and generating automation task information, that is, the contents of an automation task, including at least one of a task indicating that cloud resources should be automatically generated, modified or deleted and a task indicating that software should be automatically installed, updated or deleted with respect to the cloud resources, using the results of the interpretation, the step (step 530) of interpreting the generated automation task information and generating interface task information, that is, the contents of an interface task for instructing a specific cloud platform or one or more specific cloud resources to perform the automation task, using the results of the interpretation, and the step (step 540) of interpreting the generated interface task information and automatically constructing a cloud system by instructing a specific cloud platform or one or more specific cloud resources to perform an interface task using the results of the interpretation.

In addition, the apparatus and method for constructing a cloud system according to an embodiment of the present invention can recover a cloud system based on automation task information and interface task information corresponding to a drawing file at specific timing.

Meanwhile, the computer-readable recording medium described so far according to still another embodiment of the present invention may store a computer program for performing the method of constructing a cloud system according to another embodiment.

The description of the present invention is merely a description of some embodiments, and the scope of the claims should not be limitedly interpreted based on the contents of the some embodiments because a person with ordinary skill in the art to which the present invention pertains may modify and implement the some embodiments in various ways without departing from the scope of the claims.

INDUSTRIAL APPLICABILITY

The apparatus and method for constructing a cloud system according to an embodiment of the present invention can be used in the development industry of a cloud system and can also be used in the inspection or supervision industry and education industry for a cloud system.

What is claimed is:

1. An apparatus for constructing a cloud system including one or more cloud resources, the apparatus comprising at least one processor configured for:
    interpreting a drawing file and generating automation task information including contents of an automation task, using results of the interpretation of the drawing file, wherein the automation task includes at least one of a first task indicating that the one or more cloud resources need to be automatically generated, modified or deleted, and a second task indicating that software needs to be automatically installed, updated or deleted on the one or more cloud resources;
    interpreting the automation task information and generating interface task information including contents of an interface task for instructing a specific cloud platform or specific cloud resources to perform the automation task, using results of the interpretation of the automation task information; and
    interpreting the interface task information and automatically constructing a cloud system by instructing the specific cloud platform or the specific cloud resources to perform the interface task, using results of the interpretation of the interface task information,
    wherein the apparatus further comprises an interface task library configured for registering and storing available interface task information for each available cloud platform as a library in advance, the interface task library being connected with the at least one processor for allowing the at least one processor to access the stored interface task information, and
    wherein the interface task library includes additional interface task information different from the interface task information generated by the at least one processor.

2. The apparatus of claim 1, wherein:
    the automation task is applicable to a plurality of different cloud platforms, and
    the at least one processor generates the interface task information that matches the specific cloud platform by interpreting the automation task information.

3. The apparatus of claim 1, wherein the at least one processor is further configured for enabling a user to generate the drawing file comprising one or more figures and one or more lines while viewing a screen.

4. The apparatus of claim 3, further comprising a design drawing storage configured for storing the generated drawing file,
    wherein the drawing file stored in the design drawing storage is copiable.

5. The apparatus of claim 1, wherein when the drawing file is updated, the automation task information and the interface task information are automatically updated.

6. The apparatus of claim 1, wherein the apparatus is configured to recover the cloud system based on the automation task information and the interface task information corresponding to the drawing file at a specific time.

7. A method for constructing a cloud system including one or more cloud resources, the method comprising:
    interpreting, by at least one processor, a drawing file and generating automation task information including contents of an automation task, using results of the interpretation of the drawing file, wherein the automation task includes at least one of a first task indicating that the one or more cloud resources need to be automatically generated, modified or deleted, and a second task indicating that software needs to be automatically installed, updated or deleted on the one or more cloud resources;
    interpreting, by the at least one processor, the automation task information and generating interface task information including contents of an interface task for instructing a specific cloud platform or specific cloud resources to perform the automation task, using results of the interpretation of the automation task information; and
    interpreting, by the at least one processor, the interface task information and automatically constructing a cloud system by instructing the specific cloud platform or the specific cloud resources to perform the interface task, using results of the interpretation of the interface task information,
    wherein the method further comprises registering and storing, in an interface task library, available interface task information for each available cloud platform as a library in advance, the interface task library being connected with the at least one processor for allowing the at least one processor to access the stored interface task information, and wherein the interface task library includes additional interface task information different from the interface task information generated by the at least one processor.

8. The method of claim 7, wherein:
the automation task is applicable to a plurality of different cloud platforms, and
the generating of the interface task information comprises generating the interface task information that matches the specific cloud platform by interpreting the automation task information.

9. The method of claim 7, further comprising enabling a user to generate the drawing file comprising one or more figures and one or more lines while viewing a screen,
wherein the drawing file interpreted in the generating of the automation task information is the generated drawing file.

10. The method of claim 7, wherein when the drawing file is updated, the automation task information and the interface task information are automatically updated.

11. The method of claim 7, wherein the cloud system is recoverable based on the automation task information and the interface task information corresponding to the drawing file at a specific time.

12. A non-transitory computer-readable recording medium having a computer program stored thereon for executing the method according to claim 7.

* * * * *